United States Patent
Harner et al.

(10) Patent No.: US 11,260,421 B2
(45) Date of Patent: Mar. 1, 2022

(54) METHOD TO STRIP AND RECOAT EROSION COATINGS APPLIED TO FAN BLADES AND STRUCTURAL GUIDE VANES

(71) Applicant: United Technologies Corporation, Farmington, CT (US)

(72) Inventors: John Harner, Vernon, CT (US); John D. Riehl, Hebron, CT (US); William Bogue, Hebron, CT (US); Gary A. Wigell, Lansing, MI (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 15/656,275

(22) Filed: Jul. 21, 2017

(65) Prior Publication Data
US 2019/0022698 A1  Jan. 24, 2019

(51) Int. Cl.
| *B05D 3/00* | (2006.01) |
| *B05D 3/10* | (2006.01) |
| *B05D 3/12* | (2006.01) |
| *B05D 5/00* | (2006.01) |
| *B05D 7/00* | (2006.01) |

(Continued)

(52) U.S. Cl.
CPC ............ *B05D 5/005* (2013.01); *B05D 7/586* (2013.01); *C23C 18/1254* (2013.01); *F01D 5/005* (2013.01); *F01D 5/288* (2013.01); *B05D 3/002* (2013.01); *B05D 3/102* (2013.01); *B05D 3/12* (2013.01); *B05D 2202/25* (2013.01);
(Continued)

(58) Field of Classification Search
CPC ................. F01D 5/005; F01D 5/288

USPC .................................................. 427/140, 142
See application file for complete search history.

(56) References Cited

U.S. PATENT DOCUMENTS

| 5,814,137 A | 9/1998 | Blohowiak et al. |
| 6,037,060 A * | 3/2000 | Blohowiak ............... B32B 7/12 |
| | | 427/301 |

(Continued)

FOREIGN PATENT DOCUMENTS

| EP | 2987958 A2 | 2/2016 |
| EP | 3184180 A1 | 6/2017 |

(Continued)

OTHER PUBLICATIONS

MSDS Alconox®, retrieved from http://www.researchsupplycompany.com/MSDS_Alconox.pdf (Year: 2011).*

(Continued)

*Primary Examiner* — Jose I Hernandez-Kenney
(74) *Attorney, Agent, or Firm* — Bachman & LaPointe, P.C.

(57) ABSTRACT

A method of repairing an erosion coating coupled to a substrate, wherein the coating comprises an anodization layer on the substrate, a bond primer layer on the anodization layer, a corrosion-resistant primer on the bond primer, and an erosion coating on the corrosion-resistant primer. The method comprises abrading an erosion coating; abrading a corrosion-resistant primer; creating an abraded surface comprising a bond primer over an anodization layer coupled to the substrate, applying a sol-gel adhesion promoter layer to said abraded surface; applying a corrosion-resistant layer over the sol-gel adhesion promoter layer; and applying an erosion coating layer over the corrosion-resistant layer.

10 Claims, 5 Drawing Sheets

(51) Int. Cl.
*F01D 5/00* (2006.01)
*F01D 5/28* (2006.01)
*C23C 18/12* (2006.01)
*C25D 11/24* (2006.01)

(52) U.S. Cl.
CPC ........ *C25D 11/246* (2013.01); *F05D 2220/36* (2013.01); *F05D 2300/173* (2013.01)

(56) References Cited

U.S. PATENT DOCUMENTS

| | | | |
|---|---|---|---|
| 6,800,376 B1 | 10/2004 | Gupta et al. | |
| 7,563,513 B2 | 7/2009 | Krienke et al. | |
| 9,333,623 B2 | 5/2016 | Pillhoefer et al. | |
| 9,850,767 B2 | 12/2017 | Guo et al. | |
| 2003/0211330 A1* | 11/2003 | Anderson | B05D 5/10 428/418 |
| 2005/0235493 A1* | 10/2005 | Philip | C23C 4/02 29/889.1 |
| 2010/0239873 A1* | 9/2010 | Giannozzi | C09D 5/18 428/457 |
| 2012/0163981 A1* | 6/2012 | Hong | F01D 5/288 416/224 |
| 2016/0017712 A1 | 1/2016 | Vontell, Sr. et al. | |
| 2016/0017725 A1 | 1/2016 | Bogue et al. | |
| 2016/0201482 A1 | 7/2016 | Parkos, Jr. et al. | |

FOREIGN PATENT DOCUMENTS

| | | | |
|---|---|---|---|
| EP | 3184735 A2 * | 6/2017 | ......... C23C 18/1254 |
| EP | 3184735 A2 | 6/2017 | |
| WO | 2014150362 A1 | 9/2014 | |
| WO | 2015041841 A1 | 3/2015 | |

OTHER PUBLICATIONS

Guyson. "Plastic Blasting Media vs. Natural Blasting Media" (2016), retrieved from http://www.guyson.com/guyson-blast-blogs/blast-media-and-applications/plastic-blasting-media-vs-natural-blasting-media/ (Year: 2016).*

European Search Report dated Jan. 7, 2019 for corresponding European Patent Application No. 18184948.0.

* cited by examiner

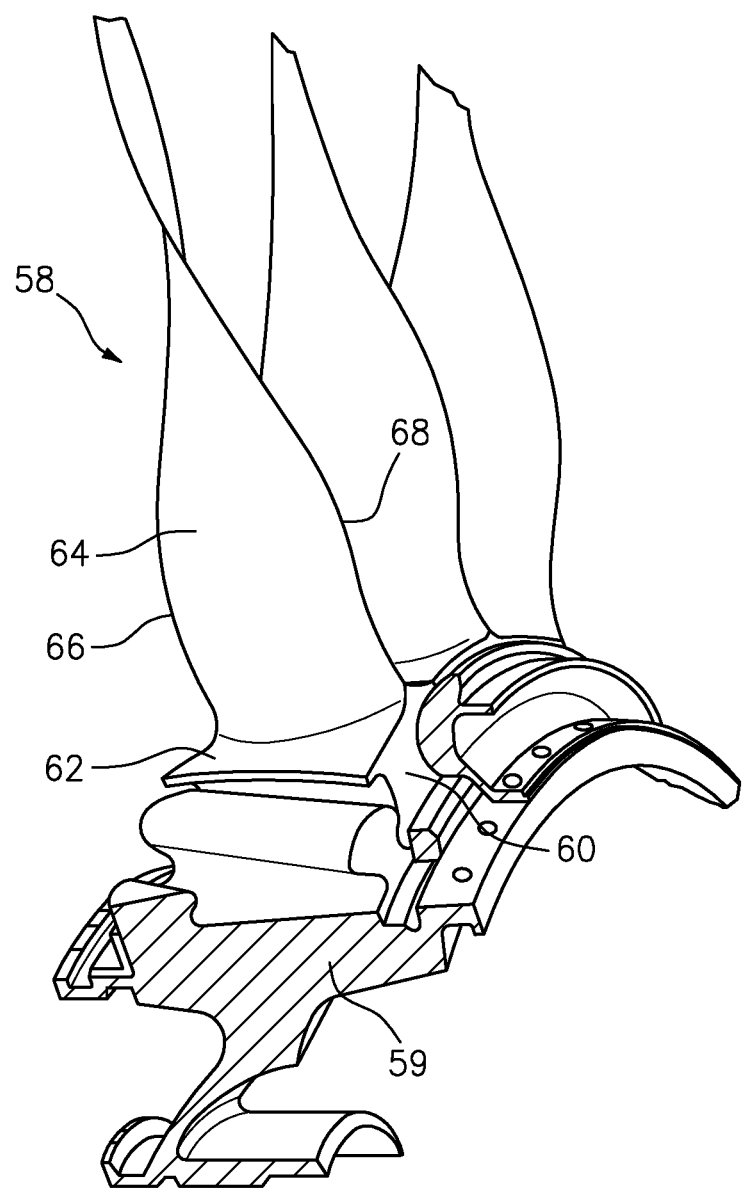

METHOD TO STRIP AND RECOAT EROSION COATINGS APPLIED TO FAN BLADES AND STRUCTURAL GUIDE VANES

BACKGROUND

The present disclosure is directed to a process to repair erosion coatings.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Gas turbine engines have rows of circumferentially spaced airfoils mounted on respective rotor disks for rotation about an engine axis. Advanced configurations feature shroud-less hollow airfoils manufactured of lightweight materials. The airfoils are designed to high tolerances and typically include a coating to accommodate significant operational requirements.

Airfoil coatings erode over time and may be reapplied as part of a repair strategy.

SUMMARY

In accordance with the present disclosure, there is provided a method of repairing an erosion coating coupled to a substrate, wherein the coating comprises an anodization layer on the substrate, a bond primer layer on the anodization layer, a corrosion-resistant primer on the bond primer, and an erosion coating on the corrosion-resistant primer. The method comprises abrading an erosion coating; abrading a corrosion-resistant primer; creating an abraded surface comprising a bond primer over an anodization layer coupled to the substrate, applying a sol-gel adhesion promoter layer to the abraded surface; applying a corrosion-resistant layer over the sol-gel adhesion promoter layer; and applying an erosion coating layer over the corrosion-resistant layer.

In another and alternative embodiment, the abraded surface comprises at least one of a portion of a bond primer over the anodization layer over the substrate and a portion of a corrosion-resistant primer over a portion of the bond primer over the anodization layer over the substrate.

In another and alternative embodiment, the abrading is selected from the group consisting of mechanical abrasion, plastic media blast, abrasive blast, grinding, sanding, and the like.

In another and alternative embodiment, the abrading step utilizes media selected from the group consisting of plastic media, walnut shells, cherry stones, starch, and $CO_2$ pellets.

In another and alternative embodiment the abrading step comprises removing the erosion coating, removing the corrosion-resistant primer, and removing a portion of the bond primer.

In another and alternative embodiment the steps of abrading results in creating an abraded surface comprising a non-homogenous combination of any of a bare metal substrate, the anodization layer, the bond primer, and the corrosion-resistant primer.

In another and alternative embodiment the process further comprises applying said sol-gel adhesion promoter layer to the abraded surface comprising the non-homogenous combination.

In another and alternative embodiment the process further comprises performing a mechanical de-oxidation technique; and removing oxidation from the abraded surface.

In another and alternative embodiment the mechanical de-oxidation technique is performed prior to applying the sol-gel adhesion promoter layer.

In another and alternative embodiment the process further comprises prior to applying the sol-gel adhesion promoter layer to the abraded surface; concurrently performing the steps of abrading the erosion coating; abrading the corrosion-resistant primer; and creating an abraded surface comprising said bond primer over the anodization layer coupled to the substrate.

In another and alternative embodiment the process further comprises scrubbing the abraded surface with at least one of a soap, an alkaline detergent, an anionic detergent, a cationic detergent, a non-ionic detergent and a caustic material prior to the sol-gel application.

In another and alternative embodiment the substrate comprises at least a portion of a blade.

Other details of the process to repair erosion coatings are set forth in the following detailed description and the accompanying drawings wherein like reference numerals depict like elements.

BRIEF DESCRIPTION OF THE DRAWINGS

FIG. 3 is a perspective view of a rotor disk with the fan blade of FIG. 2 installed.

DETAILED DESCRIPTION

Figure 1:
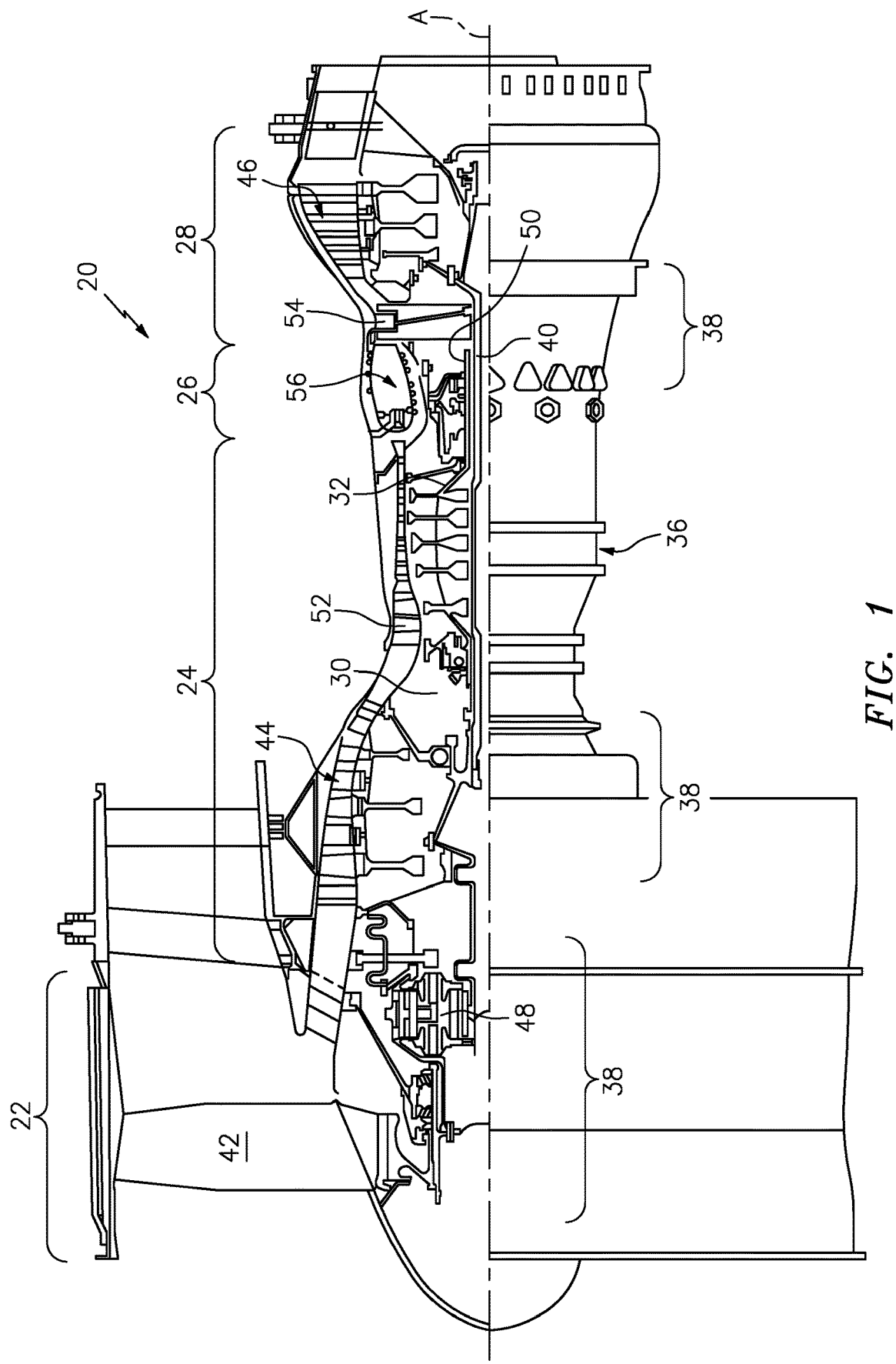
FIG. 1 is a schematic cross-section of a gas turbine engine.

FIG. 1 schematically illustrates a gas turbine engine 20. The gas turbine engine 20 as disclosed herein has a two-spool turbofan that generally incorporates a fan section 22, a compressor section 24, a combustor section 26 and a turbine section 28. The fan section 22 drives air along a bypass flow path while the compressor section 24 drives air along a core flow path for compression and communication into the combustor section 26 then expansion through the turbine section 28. Although depicted as a turbofan in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate around the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 46, 54 rotationally drive the respective low spool 30 and high spool 32 in response to the expansion. The main engine shafts 40, 50 are supported at a plurality of points by the bearing compartments 38. It should be appreciated that various bearing compartments 38 at various locations may alternatively or additionally be provided.

Figure 2:
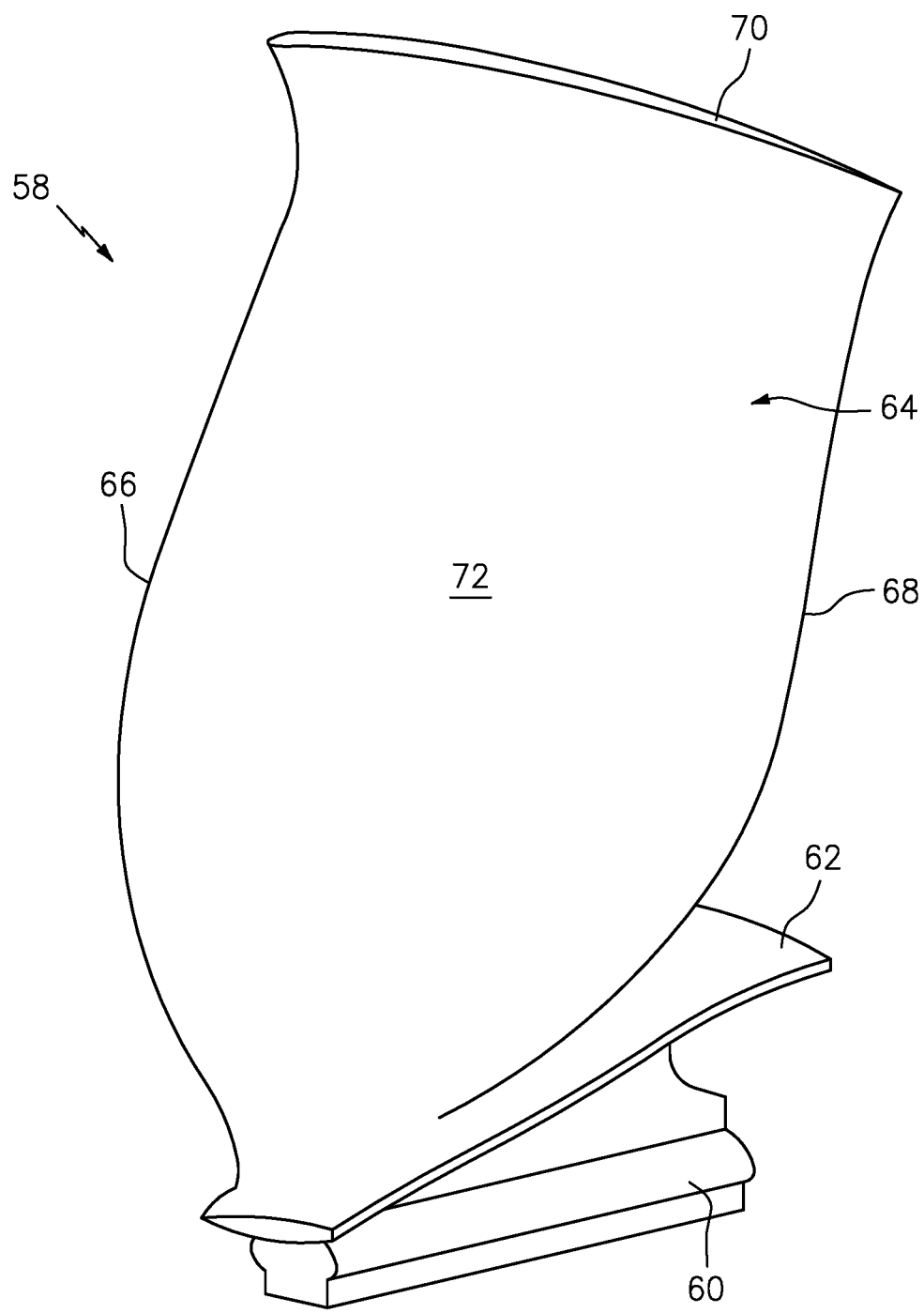
FIG. 2 is a schematic view of a fan blade for use in the gas turbine engine shown in FIG. 1.

Referring also to FIGS. 2 and 3, the fan section 22 includes a plurality of circumferentially spaced fan blades 58 which may be made of a high-strength, low weight material such as an aluminum alloy, titanium alloy, composite material or combinations thereof. It should be understood that although a single fan stage typical of a high bypass gas turbofan engine architecture is illustrated and described in the disclosed embodiments, other stages which have other blades inclusive but not limited to fan blades, high pressure compressor blades and low pressure compressor blades may also benefit from the disclosed process.

Each fan blade 58 generally includes an innermost root portion 60, an intermediate platform portion 62, and an outermost airfoil portion 64. In one form, the root portion 60 defines an attachment such as an inverted fir tree, bulb, or dovetail, so the fan blade 58 is slidably received in a complimentary configured recess provided in a fan rotor 59 (FIG. 3). The platform portion 62 generally separates the root portion 60 and the airfoil portion 64 to define an inner boundary of the air flow path. The airfoil portion 64 defines a blade chord between a leading edge 66, which may include various forward and/or aft sweep configurations, and a trailing edge 68. A concave pressure side 70 and a convex suction side 72 are defined between the leading edge 66 and the trailing edge 68. Although a fan blade 58 is illustrated in the disclosed non-limiting embodiment, compressor blades, turbofan blades, turboprop propeller blades, tilt rotor props, vanes, struts, and other airfoils may benefit from the disclosed process.

Figure 4:
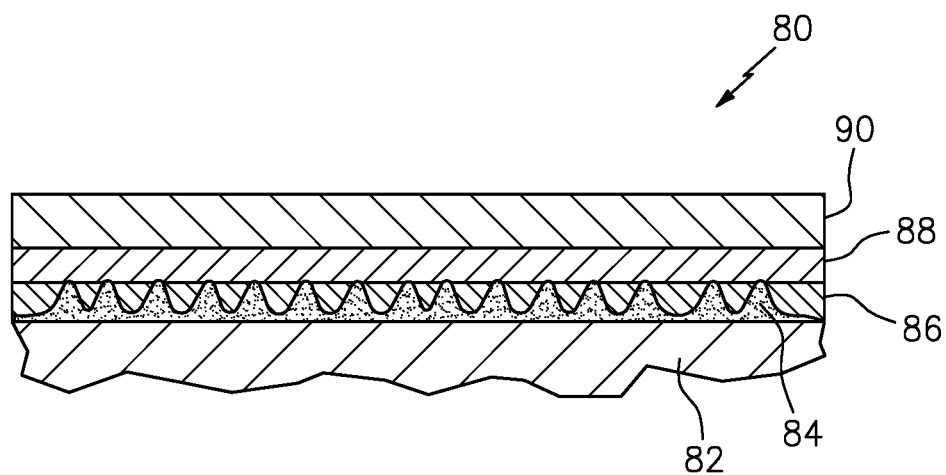
FIG. 4 is a sectional view of a coating for the example fan blade of FIG. 2.

With reference to FIG. 4, a coating 80 is applied to a substrate 82 of the fan blade 58. The coating 80 generally includes an anodization layer 84 comprising an aluminum oxide, a bond primer or bond primer layer 86, a corrosion resistant primer 88, and an erosion coating 90 coupled in layers.

The substrate 82, in this embodiment, is the fan blade 58 base metal (e.g., an aluminum alloy). The coating 80 protects the substrate 82 from corrosion, wear and other physical damage.

The anodization layer 84, in this embodiment, is defined as an oxide layer formed through a chemical anodization process. The anodization process changes the surface morphology of the aluminum surface and creates an aluminum oxide layer up to 0.0001 inches (0.00254 mm) with a microscopic roughness that greatly increases the surface area for bonding and provides for some mechanical retention of bond primers.

The bond layer 86, in this embodiment, is a corrosion inhibiting organic primer layer (e.g., epoxy-based) which may be spray-applied to a thickness of up to 0.0005 inches (0.0127 mm). The bond layer 86 is applied to increase the bond strength between the underlying aluminum/aluminum oxide 84 and the subsequent primers and coatings by inter-penetrating into the micro-roughness of the anodization layer 84 and fully covering any exposed anodize.

The corrosion resistant primer 88, in this embodiment, is an epoxy-based material and is loaded with hexavalent chromium as the active corrosion-resistant component. Alternatively, the corrosion resistant primer 88 is a non-hexavalent chromium based corrosion-resistant primer. The corrosion-resistant primer 88 is applied to a thickness of approximately 0.001 inches (0.0254 mm) to prevent corrosion of the underlying aluminum. The disclosed process can also be utilized for thicker corrosion-resistant primer layers.

The erosion coating 90, in this embodiment, is an organic erosion coating (e.g., polyurethane) with a thickness of up to 0.030 inches (0.762 mm). The erosion coating 90 protects the underlying primers and metal substrate from damage due to particle and rain impact.

Figure 5:
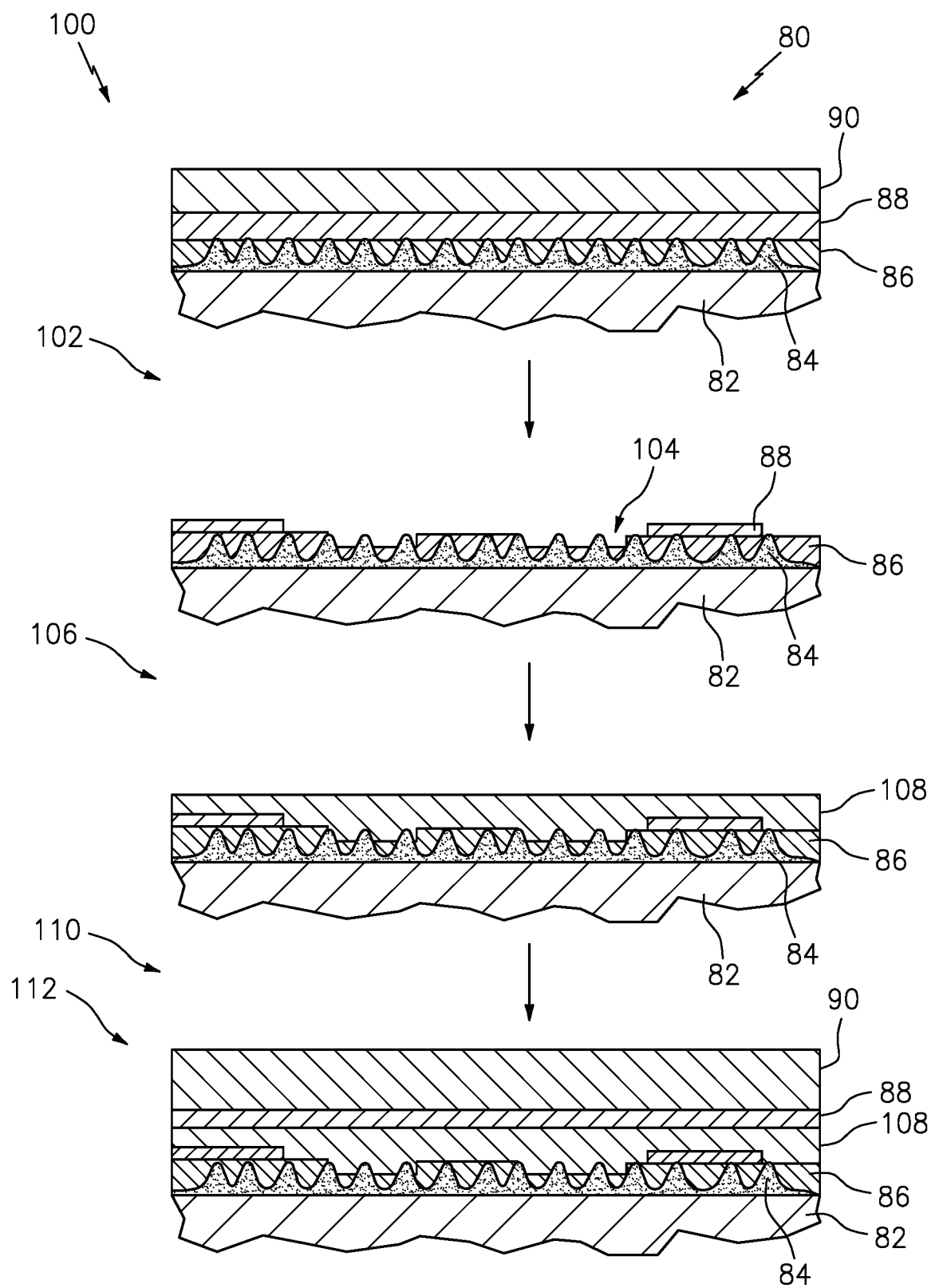
FIG. 5 is a process flow chart of an exemplary coating repair process.

With reference to FIG. 5, a method 100 for repairing or remanufacturing the coating 80 is schematically disclosed in terms of a functional block diagram flowchart. It should be appreciated that alternative or additional steps may be provided without departing from the teaching herein. The coating 80 (FIG. 4) may not be up to specification during manufacture or may be damaged such that remanufacture or repair of the coating 80 is necessitated.

The coating 80 to be remanufactured or repaired is initially abraded (102) to leave an abraded surface 104. In an exemplary embodiment, at least the erosion coating layer 90, most all of the corrosion-resistant primer layer 88, and at least a portion of the bond primer 86 can be removed by an easy/light mechanical removal technique. Some examples of mechanical removal techniques can include mechanical abrasion, plastic media blast, abrasive blast, grinding, sanding, abrasion, laser ablation, waterjet stripping, flashlamp/$CO_2$ stripping, and the like. Abrasive blasting methods can include plastic media, walnut shells, cherry stones, starch, $CO_2$ pellets and the like. Abrasive blasting can deploy harder media, including oxides, carbide or nitrides such as aluminum oxide or silicon carbide. Abrasive blasting can also include fluid jetting techniques including non-abrasive waterjet, liquid nitrogen and the like. The resultant abraded surface 104 can be relatively rough in texture and be a mixed surface with a combination of material remnants of the abraded layers 84, 86, and 88, as well as bare metal substrate. In other embodiments, portions of the bond primer 86 remain over portions of the anodization layer 84. In exemplary embodiments, a mechanical de-oxidation technique may be required to remove unwanted oxidation on the abraded surface 104. In exemplary embodiments, after the abrasion and before the application of a sol-gel, the blade can be cleaned with an alkali solution and a scrub brush. The purpose of this cleaning is to remove any remnant plastic media material from the abraded surface 104. The cleaning at this point in the process also aids the manufacturing process by giving more flexibility with the processing window. It is possible that the alkali wash may have a potential unmeasured effect on one or more of the layers which improves the bonding capability of that layer to the sol-gel. The abraded surface 104 of the blade can be scrubbed with a soap, alkaline detergent, anionic detergent, cationic detergent, non-ionic detergent or caustic prior to sol-gel application.

At step 106 a sol-gel adhesion promoter is applied to the abraded surface 104 to form a sol-gel adhesion promotion layer 108. The sol-gel adhesion promoter 108 creates a bond to each of the varying surface materials of the abraded surface 104. Sol-gel processing can include a conversion of monomers into a colloidal solution (sol) that acts as the precursor for an integrated network (or gel) of either discrete particles or network polymers. An exemplary sol-gel can be an AC130-2 or other sol-gel materials that can form similar networked polymers at the abraded surface 104 utilized in the exemplary method herein. In an exemplary embodiment, the types of adhesion promoting sol-gel materials can be characterized for the properties of adhesion to de-oxidized metal surfaces. The exemplary method utilized herein can employ a sol-gel beneficial to the application to a non-homogenous surface including de-oxidized metal, remnant anodize (aluminum oxide) and remnant organic matrix bond primer. The typical methods of mechanical de-oxidation are not required to accomplish the disclosed method. Sol-gel can be applied by various methods, including wipe applications, immersion techniques and drench shower techniques. In an exemplary embodiment, prior to applying the sol-gel adhesion promoter layer to the abraded surface the following steps can be performed concurrently; abrading the erosion coating; abrading the corrosion-resistant primer; and creating an abraded surface comprising the bond primer over the anodization layer coupled to the substrate.

At step 110 a new corrosion-resistant primer layer 88 is applied over the sol-gel adhesion promotion layer 108. At step 112 a new erosion coating layer 90 is applied over the corrosion-resistant primer layer 88.

The process of repairing erosion coatings for blades and structural guide vanes coated with erosion coatings provides the advantage of replacing damaged erosion coating with the fan blade assembled.

The process of repairing erosion coatings for blades and structural guide vanes coated with erosion coatings provides the advantage of eliminating several steps commonly used in the repair of an adhesive joint.

The process makes use of an easy mechanical material removal (plastic media blast) and bonds directly to the created surface utilizing the structure already in place from the original surface preparation steps.

The process is unlike traditional repairs that remove all of the surface preparation layers and that require the recreation of those surfaces.

There has been provided a process to repair erosion coatings. While the process to repair erosion coatings has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process of repairing a coating coupled to a metal substrate, wherein the coating comprises an anodization layer on the substrate, a bond primer layer on the anodizing layer, a corrosion-resistant primer on the bond primer, and an erosion coating on the corrosion-resistant primer, the method comprising:
   removing the entire erosion coating by a mechanical removal technique;
   abrading the corrosion-resistant primer;
   creating an abraded surface comprising a non-homogenous combination of a bare metal surface, said anodization layer, a portion of said anodization layer, said bond primer, and said corrosion-resistant primer,
   scrubbing said abraded surface with at least one of a soap, an anionic detergent, a cationic detergent, and a non-ionic detergent;
   after said scrubbing, applying a sol-gel adhesion promoter layer to said abraded surface comprising said non-homogenous combination;
   applying a corrosion-resistant layer over said sol-gel adhesion promoter layer; and
   applying an erosion coating layer over said corrosion-resistant layer.

2. The process according to claim 1, wherein said abraded surface comprises at least one of a portion of a bond primer over said anodization layer over said substrate and a portion of a corrosion-resistant primer over a portion of said bond primer over said anodization layer over said substrate.

3. The process according to claim 1, wherein said abrading comprises plastic media blast.

4. The process according to claim 1, wherein said abrading step utilizes media selected from the group consisting of plastic media, walnut shells, cherry stones, starch, and $CO_2$ pellets.

5. The process according to claim 1, wherein said abrading is selected from the group consisting of mechanical abrasion, plastic media blast, abrasive blast, grinding, sanding, laser ablation, waterjet stripping, and flashlamp/$CO_2$ stripping.

6. The process according to claim 1, wherein said abrading the corrosion-resistant primer further comprises removing said corrosion-resistant primer, and removing a portion of said bond primer.

7. The process according to claim 1 further comprising:
   performing a mechanical de-oxidation technique; and
   removing oxidation from said abraded surface.

8. The process according to claim 7, wherein said mechanical de-oxidation technique is performed prior to applying said sol-gel adhesion promoter layer.

9. The process according to claim 1 further comprising:
   prior to said applying said sol-gel adhesion promoter layer to said abraded surface;
   concurrently performing the steps of:
   removing the entire erosion coating by a mechanical removal technique;
   abrading the corrosion-resistant primer; and
   creating an abraded surface comprising said bond primer over said anodization layer coupled to said substrate.

10. The process according to claim 1 wherein said substrate comprises at least a portion of a blade.

* * * * *